(12) United States Patent
Schulenburg et al.

(10) Patent No.: US 9,034,135 B2
(45) Date of Patent: May 19, 2015

(54) HEM FLANGE JOINT

(75) Inventors: Jan Olaf Schulenburg, Uster (CH); Michael Gutgsell, Uster (CH); Yolanda Maurer, Ruschlikon (CH)

(73) Assignee: SIKA TECHNOLOGY AG, Baar (CH)

( * ) Notice: Subject to any disclaimer, the term of this patent is extended or adjusted under 35 U.S.C. 154(b) by 1255 days.

(21) Appl. No.: 12/448,493

(22) PCT Filed: Dec. 21, 2007

(86) PCT No.: PCT/EP2007/064417
§ 371 (c)(1),
(2), (4) Date: Apr. 2, 2010

(87) PCT Pub. No.: WO2008/077918
PCT Pub. Date: Jul. 3, 2008

(65) Prior Publication Data
US 2010/0266809 A1    Oct. 21, 2010

(30) Foreign Application Priority Data
Dec. 21, 2006 (EP) .................................. 06126790
Aug. 22, 2007 (CH) .................................. 1311/07

(51) Int. Cl.
*B32B 3/04* (2006.01)
*B32B 37/12* (2006.01)
*B62D 27/02* (2006.01)
*C09J 5/06* (2006.01)

(52) U.S. Cl.
CPC *C09J 5/06* (2013.01); *B62D 27/026* (2013.01)

(58) Field of Classification Search
CPC ................................. B32B 3/04; B32B 37/12
USPC ............................................ 428/124; 156/216
See application file for complete search history.

(56) References Cited

U.S. PATENT DOCUMENTS

| 5,487,803 | A  | 1/1996  | Sweeney et al. |
| 5,707,439 | A  | 1/1998  | Takekoshi et al. |
| 6,197,849 | B1 | 3/2001  | Zilg et al. |
| 6,322,890 | B1 | 11/2001 | Barron et al. |
| 6,478,915 | B1 * | 11/2002 | Schmalbruch et al. ....... 156/216 |
| 6,696,147 | B1 * | 2/2004  | Herring et al. ................ 428/323 |
| 2005/0159511 | A1 * | 7/2005 | Kramer .......................... 523/427 |
| 2007/0066721 | A1 * | 3/2007 | Kramer et al. ................ 523/400 |

FOREIGN PATENT DOCUMENTS

| DE | 32 38 651 A1 | 4/1984 |
| DE | 35 40 520 A1 | 6/1986 |
| DE | 101 09 551 A1 | 9/2002 |

(Continued)

OTHER PUBLICATIONS

May 7, 2008 International Search Report issued in International Patent Application No. PCT/EP2007/064417 (with translation).

(Continued)

*Primary Examiner* — Daniel Lee
(74) *Attorney, Agent, or Firm* — Oliff PLC

(57) ABSTRACT

The present invention relates to a method of producing an edging-fold bond. For this purpose use is made more particularly of high-viscosity adhesives. The method features reduced bubble formation within the edging fold and also within the sealant (where present) that seals the edging-fold seam. More particularly the adhesive comprises spacers which further reinforce this effect.

17 Claims, 3 Drawing Sheets

(56) References Cited

FOREIGN PATENT DOCUMENTS

| | | |
|---|---|---|
| EP | 0 254 870 A2 | 2/1988 |
| EP | 1 041 130 A2 | 10/2000 |
| EP | 1 152 019 A1 | 11/2001 |
| JP | U-61-041535 | 3/1986 |
| JP | A-05-147151 | 6/1993 |
| JP | A-05-148337 | 6/1993 |
| JP | A-05-163475 | 6/1993 |
| JP | A-10-180373 | 7/1998 |
| JP | A-11-151529 | 6/1999 |
| JP | A-2000-325876 | 11/2000 |
| JP | A-2002-512296 | 4/2002 |
| JP | A-2004-26070 | 1/2004 |
| JP | A-2005-171217 | 6/2005 |

OTHER PUBLICATIONS

Japanese Office Action dated Apr. 10, 2012 in Japanese Patent Application No. 2009-542086 (with translation).

* cited by examiner

HEM FLANGE JOINT

TECHNICAL FIELD

The invention relates to the field of hem flange adhesive bonds.

STATE OF THE ART

Hem flange adhesive bonds have been known for some time in industrial manufacture. It is known that parts of modes of transport, such as doors, trunk hoods, tailgates, engine hoods and the like can be produced from an outer panel and an inner panel by means of flange bonding. In order to ensure fixing of the flange, an adhesive is used here, which bonds the inner panel to the outer panel. In manufacturing terms, it is, however, impossible to completely fill the hem flange with adhesive. This is especially because, after the pressure is released in the course of flanging, the hem flange seam opens up again slightly owing to the elastic properties of the panel. This gives rise to cavities, which are problems of a visual nature, also relating to corrosion of the panels. Some proposals have therefore been made to optimize the operation of hem flange adhesive bonding.

DE-A-32 38 651 discloses application of a sealant material which is first gelated or cured in a first heat treatment from the side of the sealant material, and only then is the adhesive gelated in the flange seam by means of a second heat treatment by inductive heating. This is, however, disadvantageous since incorporated air gets into the inner space between inner panel and outer panel. However, corrosion can occur in these cavities.

EP-A-0 254 870 attempts to solve this problem by heating the component at the flange seam thereof to the gelation temperature and only then applying the sealing material. However, this process has the disadvantage that, owing to the heating over a wide area, the component can be significantly distorted and, in the course of cooling, cracks may occur in the sealing material or the adhesive in the flange gap.

DE-A-101 09 551 attempts to solve this problem by proposing not to heat the entire component to the gelation temperature, but instead to perform the heating locally and as far as possible immediately before the application of the sealing material. This proposed solution, however, requires very complicated equipment in apparatus terms and harbors some intrinsic weaknesses. The formation of bubbles in the adhesive is, however, not prevented by this operation, and cracks caused by the local heating in the sealing material or the adhesive are likewise not ruled out, such that, in spite of the application of a sealing layer, corrosive media cannot be prevented from getting into the hem gap and the hem edge.

SUMMARY OF THE INVENTION

It is therefore an object of the present invention to provide a process for hem flange adhesive bonding, which especially prevents or at least greatly reduces the formation of bubbles and cracks in the hem flange adhesive and hence also partly or completely prevents the formation of bubbles in any seal present.

It has been found that, surprisingly, this object is achieved by the process of the present disclosure. This is made possible especially by using a high-viscosity adhesive. This prevents bubbles or cracks from forming when the pressure is released after the flanging. In addition, in a preferred embodiment, the use of spacers allows the adhesive layer thickness to be optimized and, especially in the event of rebound of the outer panel in the course of flanging, accomplishes more optimal filling of the hem flange. Particularly suitable adhesives were found to be heat-curing epoxy resin adhesives. In a particularly advantageous embodiment, such heat-curing epoxy resin adhesives comprise specific impact modifiers, such that the quality of the hem flange adhesive bond is enhanced further and is especially improved with respect to impacts.

In a preferred embodiment of the invention, the hem flange adhesive and the sealant covering the hem flange seam can be cured simultaneously, which allows the number of process steps to be reduced and simplifies the process.

In a further aspect, the invention relates to a hem flange adhesive bond produced by this process, and to a hem flange adhesive bonded assembly and to an article comprising a hem flange adhesive bond, and to the use of the process of the present disclosure for manufacture of modes of transport or white goods.

Preferred embodiments of the invention form the subject matter of the dependent claims.

WAYS OF PERFORMING THE INVENTION

In a first aspect, the present invention relates to a process for producing a hem flange adhesive bond. Said process comprises at least the steps of
 a) applying an adhesive
    which has a viscosity at 25° C. of >900 Pas
    to an inner panel or to an outer panel;
 b) contacting the adhesive with the inner panel or the outer panel;
 c) flanging the outer panel around the inner panel such that adhesive is present in the interior of the hem flange;
 d) pressing the hem flange;
 e) introducing thermal energy into the adhesive.

The adhesive may have one component or two components.

Suitable two-component adhesives are especially room temperature curing or precuring two-component epoxy resin adhesives or polyurethane adhesives or (meth)acrylate adhesives. Room temperature precuring two-component epoxy resin adhesives or polyurethane adhesives or (meth)acrylate adhesives are understood to mean epoxy resin adhesives or polyurethane adhesives or (meth)acrylate adhesives which consist of two components, the mixing of which causes a reaction between the components, thus achieving at least a certain degree of crosslinking ("precured" or "pre-crosslinked"). Such adhesives are capable, in a further curing step, of reacting further, for example at elevated temperature. In many cases, such adhesives have so-called precuring or pregelation in the first stage, and a heat-curing reaction stage at elevated temperature.

Two-component epoxy resin adhesives have a resin component which comprises a glycidyl ether, especially a diglycidyl ether of bisphenol A and/or bisphenol F. In addition, they have a hardener component which comprises polyamines and/or polymercaptans. Such two-component epoxy resin adhesives cure rapidly at room temperature after mixing of the two components, and are known to those skilled in the art.

Two-component polyurethane adhesives have polyisocyanates in one component, especially in the form of prepolymers having isocyanate groups, and polyols and/or polyamines in a second component. Such two-component polyurethane adhesives cure rapidly at room temperature after mixing of the two components and are known to those skilled in the art.

Two-component (meth)acrylate adhesives have acrylic acid and/or methacrylic acid and/or esters thereof in one component. The second component comprises a free-radical former, especially a peroxide. Such two-component (meth) acrylate adhesives cure rapidly at room temperature after mixing of the two components and are known to those skilled in the art.

Room temperature curing two-component adhesives can also be cured under the influence of heat. This leads to a more rapid reaction and hence to a shortening of the period of time until an adhesive bond produced therewith can be stressed with forces. Moreover, a heat treatment of such room temperature curing two-component adhesives leads to higher strengths compared to those which do not undergo any such heat treatment.

Useful adhesives secondly include one-component heat-curing one-component epoxy resin adhesives. Such heat-curing one-component epoxy resin adhesives comprise at least one epoxy resin and at least one thermally activable catalyst or a hardener B for epoxy resins which is activated by elevated temperature. Particular preference is given to suitable heat-curing one-component epoxy resin adhesives, as commercially available in the SikaPower® product line from Sika Automotive GmbH.

Heating of such a one-component heat-curing one-component epoxy resin adhesive causes crosslinking. The heating is effected typically at a temperature of more than 70° C.

In a preferred embodiment, the adhesive is a heat-curing one-component epoxy resin adhesive which comprises
at least one epoxy resin A with an average of more than one epoxy group per molecule;
at least one hardener B for epoxy resins which is activated by elevated temperature;
at least one terminally capped polyurethane prepolymer of the formula (I).

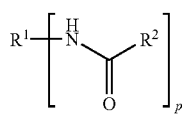

In this formula, $R^1$ is a p-valent radical of an isocyanate-terminated linear or branched polyurethane prepolymer PU1 after the removal of the terminal isocyanate groups and p is 2 to 8.

In addition, $R^2$ is independently a substituent which is selected from the group consisting of

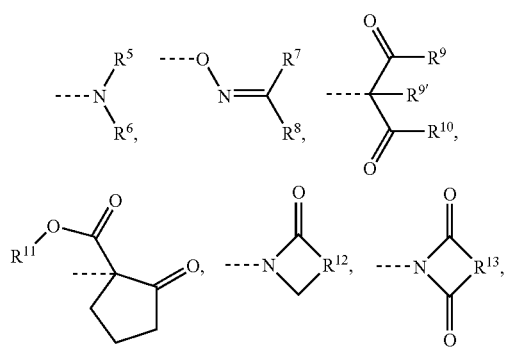

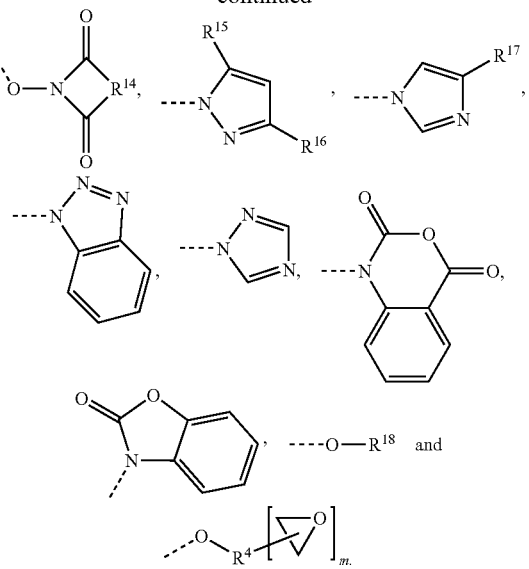

In these structures, $R^5$, $R^6$, $R^7$ and $R^8$ are each independently an alkyl or cycloalkyl or aralkyl or arylalkyl group, or $R^5$ together with $R^6$, or $R^7$ together with $R^8$, form part of a 4- to 7-membered ring which is at most substituted.

In addition, $R^{9'}$ and $R^{10}$ are each independently an alkyl or aralkyl or arylalkyl group, or an alkyloxy or aryloxy or aralkyloxy group, and $R^{11}$ is an alkyl group.

$R^{12}$, $R^{13}$ and $R^{14}$ are each independently an alkylene group which has 2 to 5 carbon atoms and optionally has double bonds or is substituted, or a phenylene group or a hydrogenated phenylene group.

$R^{15}$, $R^{16}$ and $R^{17}$ are each independently H or an alkyl group or an aryl group or an aralkyl group, and $R^{18}$ is an aralkyl group or a mono- or polycyclic, substituted or unsubstituted aromatic group which optionally has aromatic hydroxyl groups.

Finally, $R^4$ is a radical of an aliphatic, cycloaliphatic, aromatic or araliphatic epoxide containing a primary or secondary hydroxyl group after the removal of the hydroxide and epoxy groups and m is 1, 2 or 3.

The term "independently" should be interpreted within this document such that the substituents, radicals or groups with the same designation in the same molecule may occur simultaneously with different definitions. As a result, for example in formula (I), the p $R^2$ radicals need not all represent the same radical, but may, within the definition of $R^2$, have possible different definitions. For instance, it is possible in the extreme case that the terminally capped polyurethane prepolymer of the formula (I) may have 8 different $R^2$ radicals.

The broken lines in the formulae of this document each represent the bond between the particular substituent and the corresponding molecular radical.

$R^{18}$ is especially considered to be firstly phenols or polyphenols, especially bisphenols, after removal of a hydroxyl group. Preferred examples of such phenols and bisphenols are especially phenol, cresol, resorcinol, pyrocatechol, cardanol (3-pentadecenylphenol (from cashew nut shell oil)), nonylphenol, phenols which have been reacted with styrene or dicyclo-pentadiene, bisphenol A, bisphenol F and 2,2'-diallylbisphenol A.

$R^{18}$ is secondly considered to be especially hydroxybenzyl alcohol and benzyl alcohol after removal of one hydroxyl group.

If $R^5, R^6, R^7, R^8, R^9, R^{9'}, R^{10}, R^{11}, R^{15} R^{16}$ or $R^{17}$ is an alkyl group, it is especially a linear or branched $C_1$-$C_{20}$-alkyl group.

If $R^5, R^6, R^7, R^8, R^9, R^{9'}, R^{10}, R^{15}, R^{16}, R^{17}$ or $R^{18}$ is an aralkyl group, this moiety is especially a methylene-bonded aromatic group, especially a benzyl group.

If $R^5, R^6, R^7, R^8, R^9, R^{9'}$ or $R^{10}$ is an alkylaryl group, it is especially a phenylene-bonded $C_1$- to $C_{20}$-alkyl group, for example tolyl or xylyl.

The $R^2$ radicals are preferably the substituents of the formulae

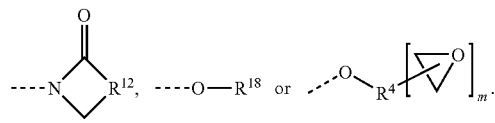

A preferred substituent of the formula is

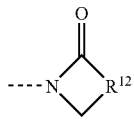

ε-caprolactam after removal of the NH proton.

Preferred substituents of the formula —O—$R^{18}$ are monophenols or polyphenols, especially bisphenols, after removal of one phenolic hydrogen atom. Particularly preferred examples of such $R^2$ radicals are radicals which are selected from the group consisting of

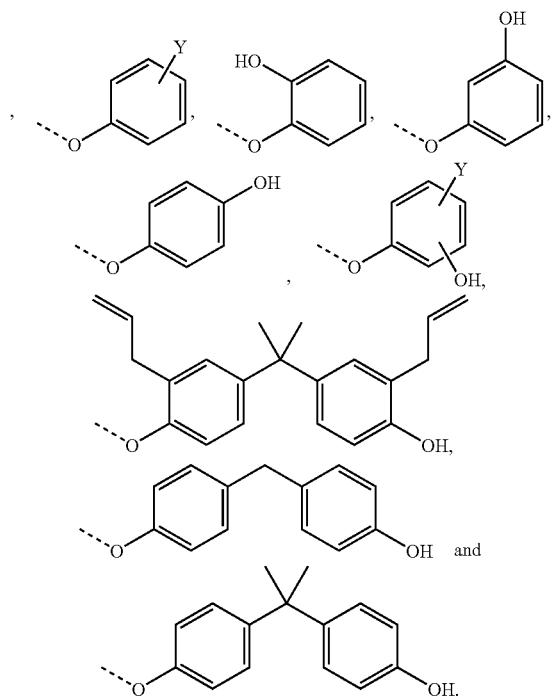

The Y radical here is a saturated or olefinically unsaturated hydrocarbon radical having 1 to 20 carbon atoms, especially having 1 to 15 carbon atoms. Preferred Y is especially allyl, methyl, nonyl, dodecyl or an unsaturated $C_{15}$-alkyl radical with 1 to 3 double bonds.

$R^2$ is most preferably

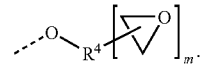

The terminally capped polyurethane prepolymer of the formula (I) is prepared from the isocyanate-terminated linear or branched polyurethane prepolymers PU1 with one or more isocyanate-reactive compounds $R^2H$. If a plurality of such isocyanate-reactive compounds are used, the reaction can be effected sequentially or with a mixture of these compounds.

The reaction is effected in such a way that the one isocyanate-reactive compound or the plurality of isocyanate-reactive compounds $R^2H$ is/are used stoichiometrically or in a stoichiometric excess, in order to ensure that all NCO groups are converted.

The polyurethane prepolymer PU1 on which $R^1$ is based can be prepared from at least one diisocyanate or triisocyanate and from a polymer $Q_{PM}$ with terminal amino, thiol or hydroxyl groups and/or from an optionally substituted polyphenol $Q_{PP}$.

In all of this present document, the prefix "poly" in "polyisocyanate", "polyol", "polyphenol" and "polymercaptan" refers to molecules which, in a formal sense, contain two or more of the particular functional groups.

Suitable diisocyanates are aliphatic, cycloaliphatic, aromatic or araliphatic diisocyanates, especially commercial products such as methylenediphenyl diisocyanate (MDI), hexamethylene diisocyanate (HDI), tolylene diisocyanate (TDI), toluidine diisocyanate (TODI), isophorone diisocyanate (IPDI), trimethylhexamethylene diisocyanate (TMDI), 2,5- or 2,6-bis(isocyanatomethyl)bicyclo[2.2.1]heptane, 1,5-naphthalene diisocyanate (NDI), dicyclohexylmethyl diisocyanate ($H_{12}$MDI), p-phenylene diisocyanate (PPDI), m-tetramethylxylylene diisocyanate (TMXDI), etc., and the dimers thereof. Preference is given to HDI, IPDI, MDI or TDI.

Suitable triisocyanates are trimers or biuretes of aliphatic, cycloaliphatic, aromatic or araliphatic diisocyanates, especially the isocyanurates and biurets of the diisocyanates described in the preceding paragraph.

It will be appreciated that it is also possible to use suitable mixtures of di- or triisocyanates.

Especially suitable polymers $Q_{PM}$ with terminal amino, thiol or hydroxyl groups are polymers $Q_{PM}$ with two or three terminal amino, thiol or hydroxyl groups.

The polymers $Q_{PM}$ advantageously have an equivalent weight of 300-6000, especially of 600-4000 and especially of 700-2200 g/equivalent of NCO-reactive groups.

Suitable polymers $Q_{PM}$ are polyols, for example the following commercial polyols or any desired mixtures thereof:
  polyoxyalkylenepolyols, also known as polyetherpolyols, which are the polymerization products of ethylene oxide, 1,2-propylene oxide, 1,2- or 2,3-butylene oxide, tetrahydrofuran or mixtures thereof, optionally polymerized with the aid of a starter molecule having two or three active hydrogen atoms, for example water, or compounds having two or three OH groups. It is possible to use either polyoxyalkylenepolyols which have a low degree of unsaturation (measured to ASTM D-2849-69 and reported in milliequivalents of unsaturation per gram of polyol (meq/g)), prepared, for example, with the aid of so-called double metal cyanide complex catalysts (DMC catalysts for short), or polyoxy-alkylenepolyols with a higher degree of unsaturation, prepared, for example, with the aid of anionic catalysts such as NaOH, KOH or alkali metal alkoxides. Particularly suitable substances are polyoxypropylenediols and -triols with a degree of unsaturation lower than 0.02 meq/g and with a molecular weight in the range of 1000-30 000 daltons, polyoxybutylenediols and -triols, polyoxy-propylenediols and -triols with a molecular weight of 400-8000 daltons, and so-called "EO-endcapped" (ethylene oxide-endcapped) polyoxypropylenediols or -triols. The latter are specific polyoxypropylenepolyoxyethylenepolyols which are obtained, for example, by alkoxylating pure polyoxypropylenepolyols with ethylene oxide on completion of the polypropoxylation, and which thus have primary hydroxyl groups;

hydroxyl-terminated polybutadienepolyols, for example those which are prepared by polymerizing 1,3-butadiene and allyl alcohol or by oxidizing polybutadiene, and the hydrogenation products thereof;

styrene-acrylonitrile-grafted polyetherpolyols, as supplied, for example, by Elastogran under the Lupranol® name;

poly-hydroxyl-terminated acrylonitrile/butadiene copolymers, as can be prepared, for example, from carboxyl-terminated acrylonitrile/butadiene copolymers (commercially available under the Hycar® CTBN name from Nanoresins AG, Germany) and epoxides or amino alcohols;

polyesterpolyols, prepared, for example, from di- to trihydric alcohols, for example 1,2-ethanediol, diethylene glycol, 1,2-propanediol, dipropylene glycol, 1,4-butanediol, 1,5-pentanediol, 1,6-hexanediol, neopentyl glycol, glycerol, 1,1,1-trimethylolpropane or mixtures of the aforementioned alcohols with organic dicarboxylic acids or the anhydrides or esters thereof, for example succinic acid, glutaric acid, adipic acid, suberic acid, sebacic acid, dodecanedicarboxylic acid, maleic acid, fumaric acid, phthalic acid, isophthalic acid, terephthalic acid and hexahydrophthalic acid, or mixtures of the aforementioned acids, and polyesterpolyols formed from lactones, for example ε-caprolactone;

polycarbonatepolyols, as obtainable by reacting, for example, the abovementioned alcohols used to form the polyesterpolyols with dialkyl carbonates, diaryl carbonates or phosgene.

The polymers $Q_{PM}$ are advantageously difunctional or higher-functionality polyols with OH equivalent weights of 300 to 6000 g/OH equivalent, especially of 600 to 4000 g/OH equivalent, preferably 700-2200 g/OH equivalent. Also advantageously, the polyols are selected from the group consisting of polyethylene glycols, polypropylene glycols, polyethylene glycol-polypropylene glycol block copolymers, polybutylene glycols, hydroxyl-terminated polybutadienes, hydroxyl-terminated butadiene/acrylonitrile copolymers, hydroxyl-terminated synthetic rubbers, the hydrogenation products thereof and mixtures of these said polyols.

In addition, the polymers $Q_{PM}$ used may also be difunctional or higher-functionality amino-terminated polyethylene ethers, propylene ethers, as sold, for example, under the Jeffamine® name by Huntsman, polybutylene ethers, polybutadienes, butadiene/acrylonitrile copolymers, as sold, for example, under the Hycar® ATBN name by Nanoresins AG, Germany, and further amino-terminated synthetic rubbers or mixtures of the components mentioned.

For certain applications, suitable polymers $Q_{PM}$ are especially polybutadienes or polyisoprenes having hydroxyl groups, or the partially or fully hydrogenated reaction products thereof.

It is additionally possible that the polymers $Q_{PM}$ may also be chain-extended, as can be performed in the manner known to those skilled in the art by the reaction of polyamines, polyols and polyisocyanates, especially of diamines, diols and diisocyanates.

Using the example of a diisocyanate and a diol, these form, as shown below, according to the selected stoichiometry, a species of the formula (VI) or (VII)

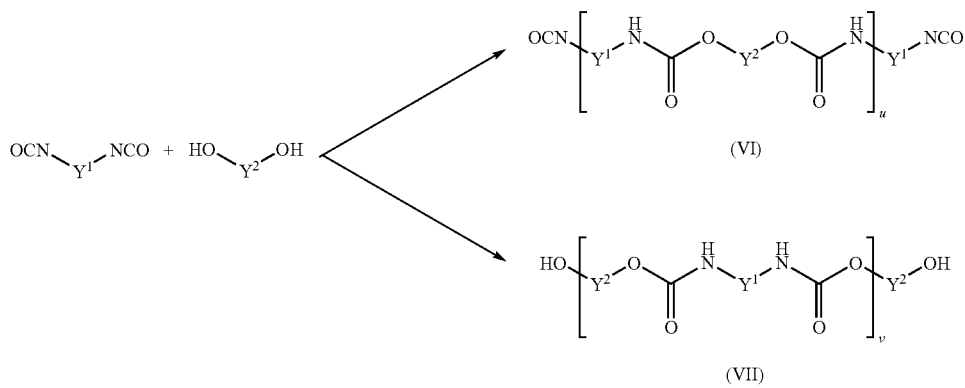

The $Y^1$ and $Y^2$ radicals are each a divalent organic radical and the indices u and v vary, according to the stoichiometric ratio, from 1 to typically 5.

These species of the formula (VI) or (VII) can then in turn be reacted further. For example, the species of the formula (VI) and a diol with a divalent organic $Y^3$ radical can form a chain-extended polyurethane prepolymer PU1 of the following formula:

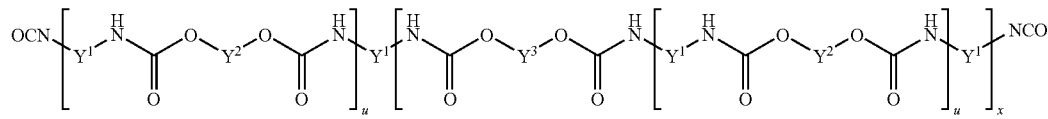

The species of the formula (VII) and a diisocyanate with a divalent organic $Y^4$ radical can form a chain-extended polyurethane prepolymer PU1 of the following formula:

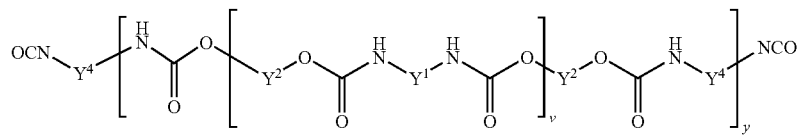

The indices x and y vary according to the stoichiometric ratio from 1 to typically 5, and are especially 1 or 2.

In addition, the species of the formula (VI) can also be reacted with the species of the formula (VII) to form a chain-extended polyurethane prepolymer PU1 having NCO groups.

For the chain extension, especially diols and/or diamines and diisocyanates are preferred. It will be appreciated that it is clear to the person skilled in the art that it is also possible to use for the chain extension higher-functionality polyols, for example trimethylolpropane or pentaerythritol, or higher-functionality polyisocyanates, such as isocyanurates of diisocyanates.

In the polyurethane prepolymers PU1 in general and in the case of the chain-extended polyurethane prepolymers specifically, it should advantageously be ensured that the prepolymers do not have excessively high viscosities, especially when higher-functionality compounds are used for the chain extension, since this can complicate the conversion thereof to the polyurethane prepolymers of the formula (I) or the application of the adhesive.

Preferred polymers $Q_{PM}$ are polyols with molecular weights between 600 and 6000 daltons, selected from the group consisting of polyethylene glycols, polypropylene glycols, polyethylene glycol-polypropylene glycol block polymers, polybutylene glycols, hydroxyl-terminated polybutadienes, hydroxyl-terminated butadiene-acrylonitrile copolymers and mixtures thereof.

Especially preferred polymers $Q_{PM}$ are α,ω-dihydroxy-polyalkylene glycols with $C_2$-$C_6$-alkylene groups or with mixed $C_2$-$C_6$-alkylene groups terminated with amino, thiol or preferably hydroxyl groups. Particular preference is given to polypropylene glycols or polybutylene glycols. Also particularly preferred are hydroxyl-terminated polyoxybutylenes.

Especially suitable polyphenols $Q_{PP}$ are bis-, tris- and tetraphenols. These are understood to mean not just pure phenols, but if appropriate also substituted phenols. The type of substitution may vary widely. More particularly, this is understood to mean substitution directly on the aromatic ring to which the phenolic OH group is bonded. Phenols are also understood to mean not just monocyclic aromatics but also polycyclic or fused aromatics or heteroaromatics which have the phenolic OH group directly on the aromatic or heteroaromatic.

The type and position of such a substituent influences, among other things, the reaction with isocyanates which is necessary for the formation of the polyurethane prepolymer PU1.

The bis- and trisphenols are particularly suitable. Examples of suitable bisphenols or trisphenols include 1,4-dihydroxybenzene, 1,3-dihydroxy-benzene, 1,2-dihydroxybenzene, 1,3-dihydroxytoluene, 3,5-dihydroxy-benzoates, 2,2-bis(4-hydroxyphenyl)propane (=bisphenol A), bis(4-hydroxy-phenyl)methane (=bisphenol F), bis(4-hydroxyphenyl)sulfone (=bisphenol S), naphthoresorcinol, dihydroxynaphthalene, dihydroxyanthraquinone, dihydroxybiphenyl, 3,3-bis(p-hydroxyphenyl)phthalide, 5,5-bis(4-hydroxyphenyl)hexa-hydro-4,7-methanoindane, phenolphthalein, fluorescein, 4,4'-[bis(hydroxyphenyl)-1,3-phenylenebis(1-methylethylidene)] (=bisphenol M), 4,4'-[bis(hydroxyphenyl)-1,4-phenylenebis(1-methylethylidene)] (=bisphenol P), 2,2'-diallylbisphenol A, diphenols and dicresols prepared by reacting phenols or cresols with diisopropylidenebenzene, phloroglucinol, gallic esters, phenol or cresol novolacs with —OH functionality of 2.0 to 3.5, and all isomers of the aforementioned compounds.

Preferred diphenols and dicresols prepared by reaction of phenols or cresols with diisopropylidenebenzene have a chemical structural formula as shown correspondingly for cresol as an example:

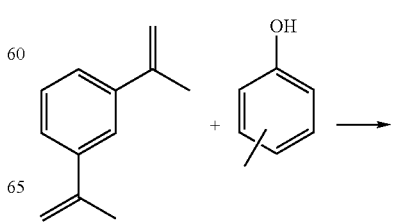

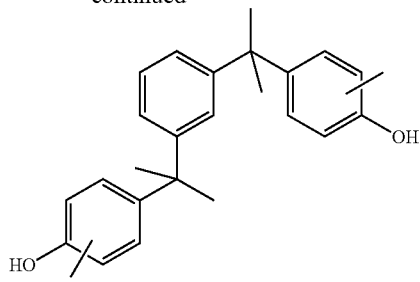

Particular preference is given to nonvolatile bisphenols. Most preferred are bisphenol M, bisphenol S and 2,2'-diallyl bisphenol A.

The $Q_{PP}$ preferably has 2 or 3 phenolic groups.

In a first embodiment, the polyurethane prepolymer PU1 is prepared from at least one diisocyanate or triisocyanate and a polymeric $Q_{PM}$ with terminal amino, thiol or hydroxyl groups. The polyurethane prepolymer PU1 is prepared in a manner known to the person skilled in the art of polyurethane, especially by using the diisocyanate or triisocyanate in a stoichiometric excess in relation to the amino, thiol or hydroxyl groups of the polymer $Q_{PM}$.

In a second embodiment, the polyurethane prepolymer PU1 is prepared from at least one diisocyanate or triisocyanate and from an optionally substituted polyphenol $Q_{PP}$. The polyurethane prepolymer PU1 is prepared in a manner known to the person skilled in the art of polyurethane, especially by using the diisocyanate or triisocyanate in a stoichiometric excess in relation to the phenolic groups of the polyphenol $Q_{PP}$.

In a third embodiment, the polyurethane prepolymer PU1 is prepared from at least one diisocyanate or triisocyanate, and from a polymer $Q_{PM}$ with terminal amino, thiol or hydroxyl groups, and from an optionally substituted polyphenol $Q_{PP}$. For preparation of the polyurethane prepolymer PU1 from at least one diisocyanate or triisocyanate and from a polymer $Q_{PM}$ with terminal amino, thiol and/or hydroxyl groups and/or from an optionally substituted polyphenol $Q_{PP}$, different options are available.

In a first process, known as "one-pot process", a mixture of at least one polyphenol $Q_{PP}$ and at least one polymer $Q_{PM}$ is reacted with at least one diisocyanate or triisocyanate in an isocyanate excess.

In a second process, known as "2-step process I", at least one polyphenol $Q_{PP}$ is reacted with at least one diisocyanate or triisocyanate in an isocyanate excess and then with at least one polymer $Q_{PM}$ in deficiency.

In a third process, finally, known as "2-step process II", at least one polymer $Q_{PM}$ is reacted with at least one diisocyanate or triisocyanate in an isocyanate excess and then with at least one polyphenol $Q_{PP}$ in deficiency.

The three processes lead to isocyanate-terminated polyurethane prepolymers PU1, the sequence of whose monomers may differ with the same composition. All three variants are suitable, but the "2-step process II" is preferred.

When the isocyanate-terminal polyurethane prepolymers PU1 described are formed from difunctional components, it was found that the polymer $Q_{PM}$/polyphenol $Q_{PP}$ equivalence ratio is preferably greater than 1.50, and the polyisocyanate/ (polyphenol $Q_{PP}$+polymer $Q_{PM}$) equivalence ratio is preferably greater than 1.20.

When the average functionality of the components used becomes greater than 2, a more rapid molecular weight increase occurs than in the purely difunctional case. It is clear to the person skilled in the art that the limits of the possible equivalence ratios depend significantly on whether the selected polymer $Q_{PM}$, the polyphenol $Q_{PP}$, the polyisocyanate or a plurality of the components mentioned has/have a functionality of >2. Accordingly, different equivalence ratios can be established, the limits of which are determined by the viscosity of the resulting polymers, and which must be determined experimentally from case to case.

The polyurethane prepolymer PU1 preferably has elastic character and exhibits a glass transition temperature Tg of less than 0° C.

A particularly preferred isocyanate-reactive compound $R^2H$ is considered to be the monohydroxyl epoxide compound of the formula (V).

(V)

If a plurality of such monohydroxyl epoxide compounds are used, the reaction can be effected sequentially or can be effected with a mixture of these compounds.

The monohydroxyl epoxide compound of the formula (V) has 1, 2 or 3 epoxy groups. The hydroxyl group of this monohydroxyl epoxide compound (V) may be a primary or secondary hydroxyl group.

Such monohydroxyl epoxide compounds can be obtained, for example, by reacting polyols with epichlorohydrin. According to the reaction regime, by-products also formed in the reaction of polyfunctional alcohols with epichlorohydrin are the corresponding monohydroxyl epoxide compounds in different concentrations. These can be isolated by customary separating operations. In general, however, it is sufficient to use the product mixture of polyol which has reacted completely and partially to give the glycidyl ether obtained in the glycidylization reaction of polyols. Examples of such hydroxyl-containing epoxides are butanediol monoglycidyl ether (present in butanediol diglycidyl ether), hexanediol monoglycidyl ether (present in hexanediol diglycidyl ether), cyclohexanedimethanol glycidyl ether, trimethylolpropane diglycidyl ether (present as a mixture in trimethylolpropane triglycidyl ether), glyceryl diglycidyl ether (present as a mixture in glyceryl triglycidyl ether), pentaerythritol triglycidyl ether (present as a mixture in pentaerythritol tetraglycidyl ether). Preference is given to using trimethylolpropane diglycidyl ether, which occurs in a relatively high proportion in customarily prepared trimethylolpropane triglycidyl ether.

However, it is also possible to use other similar hydroxyl-containing epoxides, especially glycidol, 3-glycidyloxybenzyl alcohol or hydroxymethyl-cyclohexene oxide. Additionally preferred is the β-hydroxy ether of the formula (IX) which is present to an extent of about 15% in commercial liquid epoxy resins prepared from bisphenol A (R=CH₃) and epichlorohydrin, and the corresponding β-hydroxy ethers of the formula (IX) which are formed in the reaction of bisphenol F (R=H) or the mixture of bisphenol A and bisphenol F with epichlorohydrin.

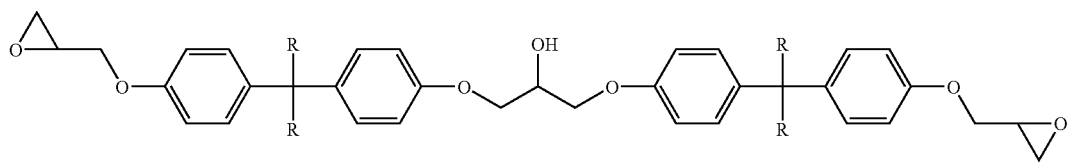

(IX)

Additionally preferred are also distillation residues which are obtained in the preparation of high-purity distilled liquid epoxy resins. Such distillation residues have a concentration of hydroxyl-containing epoxides up to three times higher than that in commercial undistilled liquid epoxy resins. In addition, it is also possible to use a wide variety of different epoxides with a β-hydroxy ether group, prepared by the reaction of (poly)epoxides with a deficiency of monofunctional nucleophiles such as carboxylic acids, phenols, thiols or sec-amines.

The $R^4$ radical is especially preferably a trivalent radical of the formula

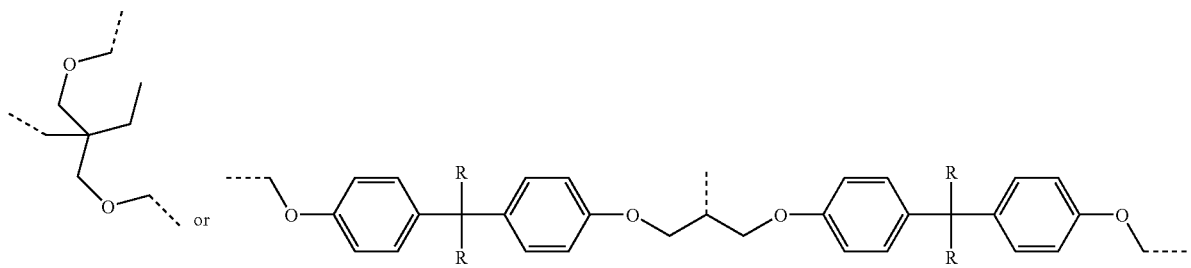

where R is methyl or H.

The free primary or secondary OH functionality of the monohydroxyl epoxide compound of the formula (V) permits an efficient reaction with terminal isocyanate groups of the prepolymers without any need to use disproportionate excesses of the epoxide component for that purpose.

The amount of the terminally capped polyurethane prepolymer of the formula (I) is advantageously between 1 and 45% by weight, especially between 3 and 35% by weight, based on the total weight of the heat-curing epoxy resin adhesive.

The heat-curing one-component epoxy resin adhesive contains at least one epoxy resin A with an average of more than one epoxy group per molecule. The epoxy group is preferably present as a glycidyl ether group. The epoxy resin A with an average or more than one epoxy group per molecule is preferably a liquid epoxy resin or a solid epoxy resin. The term "solid epoxy resin" is very well known to the person skilled in the art of epoxides and is used in contrast to "liquid epoxy resins". The glass transition temperature of solid resins is above room temperature, i.e. they can be comminuted at room temperature to free-flowing powders.

Preferred solid epoxy resins have the formula (X)

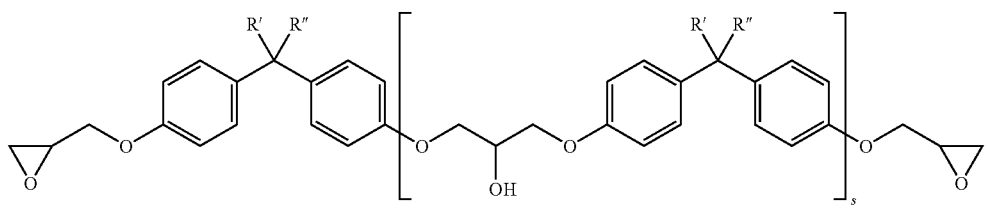

(X)

In this formula, the substituents R' and R" are each independently either H or CH₃.

In addition, the index s is a value of >1.5, especially of 2 to 12.

Such solid epoxy resins are commercially available, for example, from Dow or Huntsman or Hexion.

Compounds of the formula (X) with an index s between 1 and 1.5 are referred to as semisolid epoxy resins by the person skilled in the art. For this present invention, they are likewise considered to be solid resins. Preference is given, however, to epoxy resins in the narrower sense, i.e. where the index s has a value of >1.5.

Preferred liquid epoxy resins have the formula (XI)

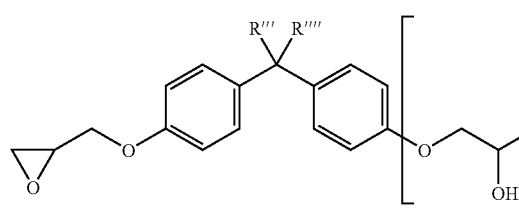 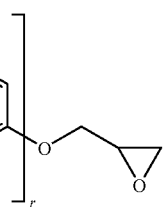

(XI)

In this formula, the substituents R''' and R'''' are each independently either H or CH₃. In addition, the index r is 0 to 1. r is preferably a value of less than 0.2.

These are thus preferably diglycidyl ethers of bisphenol A (DGEBA), of bisphenol F and of bisphenol A/F (the designation 'A/F' refers here to a mixture of acetone with formaldehyde, which is used as a reactant in the preparation thereof). Such liquid resins are available, for example, as Araldite® GY 250, Araldite® PY 304, Araldite® GY 282 (Huntsman) or D.E.R.™ 331 or D.E.R.™ 330 (Dow) or Epikote 828 (Hexion).

The epoxy resin A is preferably a liquid epoxy resin of the formula (XI). In an even more preferred embodiment, the heat-curing epoxy resin adhesive comprises both at least one liquid epoxy resin of the formula (XI) and at least one solid epoxy resin of the formula (X).

The proportion of epoxy resin A is preferably 10-85% by weight, especially 15-70% by weight, preferably 15-60% by weight, of the weight of the adhesive.

The heat-curing one-component epoxy resin adhesive further comprises at least one hardener B for epoxy resins, which is activated by elevated temperature. This is preferably a hardener which is selected from the group consisting of dicyandiamide, guanamines, guanidines, aminoguanidines and derivatives thereof. Also possible are accelerating hardeners such as substituted ureas, for example 3-(3-chloro-4-methylphenyl)-1,1-dimethylurea (chlorotoluron), or phenyldimethylureas, especially p-chlorophenyl-N,N-dimethylurea (monuron), 3-phenyl-1,1-dimethylurea (fenuron) or 3,4-dichlorophenyl-N,N-dimethylurea (diuron). In addition, it is possible to use compounds from the class of the imidazoles and amine complexes.

The hardener B is preferably a hardener which is selected from the group consisting of dicyandiamide, guanamines, guanidines, aminoguanidines and derivatives thereof; substituted ureas, especially 3-(3-chloro-4-methylphenyl)-1,1-dimethylurea (chlorotoluron), or phenyldimethylureas, especially p-chlorophenyl-N,N-dimethylurea (monuron), 3-phenyl-1,1-dimethylurea (fenuron), 3,4-dichlorophenyl-N,N-dimethylurea (diuron), and imidazoles and amine complexes.

A particularly preferred hardener B is dicyandiamide.

The total proportion of the hardener B is advantageously 0.5-12% by weight, preferably 1-8% by weight, based on the weight of the overall adhesive.

The heat-curing epoxy resin adhesive may further comprise a thixotropic agent C based on a urea derivative. The urea derivative is especially a reaction product of an aromatic monomeric diisocyanate with an aliphatic amine compound. It is also entirely possible to react a plurality of different monomeric diisocyanates with one or more aliphatic amine compounds, or one monomeric diisocyanate with a plurality of aliphatic amine compounds. The reaction product of 4,4'-diphenylmethylene diisocyanate (MDI) with butylamine has been found to be particularly advantageous.

The urea derivative is preferably present in a carrier material. The carrier material may be a plasticizer, especially a phthalate or an adipate, preferably a diisodecyl phthalate (DIDP) or dioctyl adipate (DOA). The carrier may also be a nondiffusing carrier. This is preferred in order to ensure, as far as possible, low migration after curing of unreacted constituents. Preferred nondiffusing carriers are capped polyurethane prepolymers.

The preparation of such preferred urea derivatives and carrier materials is described in detail in patent application EP 1 152 019 A1. The carrier material is advantageously a capped polyurethane prepolymer PU2, especially obtained by reacting a trifunctional polyetherpolyol with IPDI and subsequently capping the terminal isocyanate groups with ε-caprolactam.

The total proportion of the thixotropic agent C is advantageously 0-40% by weight, preferably 5-25% by weight, based on the weight of the overall adhesive. The ratio of weight of the urea derivative to the weight of any carrier present is preferably 2/98 to 50/50, especially 5/95-25/75.

The heat-curing epoxy resin adhesive preferably further comprises a liquid rubber D, which is preferably a carboxyl- or epoxy-terminated polymer.

In a first embodiment, this liquid rubber D is a carboxyl- or epoxy-terminated acrylonitrile/butadiene copolymer or a derivative thereof. Such liquid rubbers are commercially available, for example, under the Hycar® CTBN and CTBNX and ETBN names from Nanoresins AG, Germany. Suitable derivatives are especially elastomer-modified prepolymers having epoxy groups, as sold commercially under the Polydis® product line, preferably from the Polydis® 36. product line, by Struktol® (Schill+Seilacher Gruppe, Germany) or under the Albipox product line (Nanoresins, Germany).

In a second embodiment, this liquid rubber D is a polyacrylate liquid rubber which is completely miscible with liquid epoxy resins and does not separate to form microdroplets until the curing of the epoxy resin matrix. Such polyacrylate liquid rubbers are available, for example, under the 20208-XPA name from Rohm and Haas.

It is clear to the person skilled in the art that it is of course also possible to use mixtures of liquid rubbers, especially mixtures of carboxyl or epoxy-terminated acrylonitrile/butadiene copolymers or of derivatives thereof.

The liquid rubber D is advantageously used in an amount of 1-35% by weight, especially 1-25% by weight, based on the weight of the adhesive.

The heat-curing epoxy resin adhesive preferably further comprises a solid toughness improver E. A "toughness improver" is understood here and hereinafter to mean an addition to an epoxy resin matrix which, even in the case of small additions of 0.1-15% by weight, especially of 0.5-8% by weight, brings about a significant increase in toughness and is thus capable of absorbing relatively high flexural, tensile, impact or shock stress before the matrix cracks or breaks.

In a first embodiment, the solid toughness improver E is an organic ion-exchanged lamellar mineral E1.

The ion-exchanged lamellar mineral E1 may either be a cation-exchanged lamellar mineral E1c or an anion-exchanged lamellar mineral E1a. The cation-exchanged lamellar mineral E1c is obtained here from a lamellar mineral E1' in which at least some of the cations have been exchanged for organic cations. Examples of such cation-exchanged lamellar minerals E1c are especially those which are mentioned in U.S. Pat. No. 5,707,439 or in U.S. Pat. No. 6,197,849. The process for producing these cation-exchanged lamellar minerals E1c is likewise described there. A preferred lamellar mineral E1' is a sheet silicate. Especially preferably, the lamellar mineral E1' is a phyllosilicate as described in U.S. Pat. No. 6,197,849, column 2 line 38 to column 3 line 5, especially a bentonite. Particularly suitable lamellar minerals E1' have been found to be those such as kaolinite or a montmorillonite or a hectorite or an illite.

At least some of the cations of the lamellar mineral E1' are replaced by organic cations. Examples of such cations are n-octylammonium, trimethyl-dodecylammonium, dimethyl-dodecylammonium or bis(hydroxyethyl)octadecyl-ammonium, or similar derivatives of amines which can be obtained from natural fats and oils; or guanidinium cations or amidinium cations; or cations of the N-substituted derivatives of pyrrolidine, piperidine, piperazine, morpholine, thiomorpholine; or cations of 1,4-diazabicyclo[2.2.2]octane (DABCO) and 1-azabicyclo[2.2.2]octane; or cations of N-substituted derivatives of pyridine, pyrrole, imidazole, oxazole, pyrimidine, quinoline, isoquinoline, pyrazine, indole, benzimidazole, benzoxazole, thiazole, phenazine and 2,2'-bipyridine. Additionally suitable are cyclic amidinium cations, especially those as disclosed in U.S. Pat. No. 6,197,849 in column 3 line 6 to column 4 line 67. Cyclic ammonium compounds are notable for an increased thermal stability over linear ammonium compounds, since the thermal Hoffmann degradation cannot occur therein.

Preferred cation exchanged lamellar minerals E1c are known to those skilled in the art under the term organoclay or nanoclay and are commercially available, for example, under the group names Tixogel® or Nanofil®(Südchemie), Cloisite® (Southern Clay Products) or Nanomer® (Nanocor Inc.).

The anion-exchanged lamellar mineral E1a is obtained here from a lamellar mineral E1" in which at least some of the anions have been exchanged for organic anions. One example of such an anion-exchanged lamellar mineral E1a is a hydrotalcite E1" in which at least some of the carbonate anions of the intermediate layers have been exchanged for organic anions. A further example is functionalized aluminoxanes as described, for example, in U.S. Pat. No. 6,322,890.

It is also entirely possible that the composition simultaneously comprises a cation-exchanged lamellar mineral E1c and an anion-exchanged lamellar mineral E1a.

In a second embodiment, the solid toughness improver is a block copolymer E2. The block copolymer E2 is obtained from an anionic or controlled free-radical polymerization of methacrylic esters with at least one further monomer having an olefinic double bond. Preferred monomers having olefinic double bonds are especially those in which the double bond is conjugated directly to a heteroatom or to at least one further double bond. Especially suitable are monomers which are selected from the group comprising styrene, butadiene, acrylonitrile and vinyl acetate. Preference is given to acrylic ester-styrene-acrylic acid (ASA) copolymers, obtainable, for example, under the GELOY 1020 name from GE Plastics.

Particularly preferred block copolymers E2 are block copolymers formed from methyl methacrylate, styrene and butadiene. Such block copolymers are available, for example, as triblock copolymers under the group name SBM from Arkema.

In a third embodiment, the solid toughness improver E is a core-shell polymer E3. Core-shell polymers consist of an elastic core polymer and a rigid shell polymer. Especially suitable core-shell polymers consist of a core of elastic acrylate or butadiene polymer which is surrounded by a rigid shell of a rigid thermoplastic polymer. This core-shell structure either forms spontaneously as a result of separation of a block copolymer or is imposed by the polymerization regime as a latex or suspension polymerization with subsequent grafting. Preferred core-shell polymers are so-called MBS polymers which are obtainable commercially under the Clearstrength™ trade name from Atofina, Paraloid™ from Rohm and Haas or F-351™ from Zeon.

Particularly preferred core-shell polymer particles are those which are already present as an dried polymer latex. Examples thereof are GENIOPERL M23A from Wacker with polysiloxane core and acrylate shell, radiation-crosslinked rubber particles of the NEP series, manufactured by Eliokem, or Nanoprene from Lanxess or Paraloid EXL from Rohm and Haas.

Further comparable examples of core-shell polymers are supplied under the Albidur™ name by Nanoresins AG, Germany.

In a fourth embodiment, the solid toughness improver E is a solid reaction product E4 of a carboxylated solid nitrile rubber with excess epoxy resin.

Preferred solid toughness improvers E are core-shell polymers.

The heat-curing epoxy resin may comprise the solid core-shell polymer E3, especially in an amount of 0.1-15% by weight, preferably 1-8% by weight, based on the weight of the adhesive.

In a further preferred embodiment, the heat-curing epoxy resin adhesive additionally comprises at least one filler F. This is preferably mica, talc, kaolin, wollastonite, feldspar, syenite, chlorite, bentonite, montmorillonite, calcium carbonate (precipitated or ground), dolomite, quartz, silicas (fumed or precipitated), cristobalite, calcium oxide, aluminum hydroxide, magnesium oxide, hollow ceramic spheres or color pigments. Fillers F mean both the organically coated and the uncoated commercially available forms known to those skilled in the art.

Advantageously, the total proportion of the overall filler F is 3-50% by weight, preferably 5-35% by weight, especially 5-25% by weight, based on the weight of the overall adhesive.

In a further preferred embodiment, the heat-curing epoxy resin adhesive comprises a physical or chemical blowing agent, as obtainable, for example, under the Expancel™ trade name from Akzo Nobel or Celogen™ from Chemtura. The proportion of the blowing agent is advantageously 0.1-3% by weight, based on the weight of the adhesive.

In a further preferred embodiment, the heat-curing epoxy resin adhesive additionally comprises at least one reactive diluent G bearing epoxy groups. These reactive diluents G are especially:

glycidyl ethers of monofunctional saturated or unsaturated, branched or unbranched, cyclic or open-chain $C_4$-$C_{30}$-alcohols, e.g. butanol glycidyl ether, hexanol glycidyl ether, 2-ethylhexanol glycidyl ether, allyl glycidyl ether, tetrahydrofurfuryl and furfuryl glycidyl ether, trimethoxy-silyl glycidyl ether, etc.

glycidyl ethers of difunctional saturated or unsaturated, branched or unbranched, cyclic or open-chain $C_2$-$C_{30}$-alcohols, e.g. ethylene glycol glycidyl ether, butanediol glycidyl ether, hexanediol glycidyl ether, octanediol glycidyl ether, cyclohexanedimethanol diglycidyl ether, neopentyl glycol diglycidyl ether, etc.

glycidyl ethers of tri- or polyfunctional, saturated or unsaturated, branched or unbranched, cyclic or open-chain alcohols such as epoxidized castor oil, epoxidized trimethylolpropane, epoxidized pentaerythritol, or polyglycidyl ethers of aliphatic polyols such as sorbitol, glycerol, trimethylolpropane, etc.

glycidyl ethers of phenol and aniline compounds such as phenyl glycidyl ether, cresyl glycidyl ether, p-tert-butylphenyl glycidyl ether, nonylphenol glycidyl ether, 3-n-pentadecenyl glycidyl ether (from cashew nut shell oil), N,N-diglycidylaniline, etc.

epoxidized amines such as N,N-diglycidylcyclohexylamine, etc.

epoxidized mono- or dicarboxylic acids such as glycidyl neodecanoate, glycidyl methacrylate, glycidyl benzoate, diglycidyl phthalate, tetrahydrophthalate and hexahydrophthalate, diglycidyl esters of dimeric fatty acids, etc.

epoxidized di- or trifunctional, low to high molecular weight polyether-polyols such as polyethylene glycol diglycidyl ether, polypropylene glycol diglycidyl ether, etc.

Particular preference is given to hexanediol diglycidyl ether, cresyl glycidyl ether, p-tert-butylphenyl glycidyl ether, polypropylene glycol diglycidyl ether and polyethylene glycol diglycidyl ether.

The total proportion of the reactive diluent G bearing epoxy groups is advantageously 0.5-20% by weight, preferably 1-8% by weight, based on the weight of the overall adhesive.

The heat-curing epoxy resin adhesive may comprise further constituents, especially catalysts, heat and/or light stabilizers, thixotropic agents, plasticizers, solvents, mineral or organic fillers, blowing agents, dyes, adhesion promoters and pigments.

In a particularly preferred embodiment, the adhesive comprises spacers. In the present document, a spacer is understood to mean a body which keeps two bodies spaced apart when the spacer is present between these two bodies.

The spacer may have different configurations. It is possible to use very different materials and shapes of spacers. The spacer may, for example, be flat, ribbonlike, rod-shaped, cuboidal, cubic, conical, frustoconical, pyramidal, frustopyramidal, spheroidal, ellipsoidal or spherical. Particular preference is given to those spacers which have very substantially uniform thicknesses. Preference is further given to those spacers which have no points at right angles to the inner panel and/or outer panel because the small contact area of the outer panel and/or of the inner panel might cause the panel to deform at the great pressure, such that the position of the spacers can show on the outer panel, which is visually unacceptable in many cases. Preference is given especially to spheres and cubes as spacers.

The spacers have especially a spheroidal form, preferably a spherical form. Most preferred are spherical spacers.

The spacers may be hollow or filled. Hollow spacers are in many cases preferred for weight reasons. The wall thickness of such hollow spacers depends on the mechanical properties of the wall material, especially the compressive strength thereof. Examples of such hollow spacers are hollow glass spheres, hollow ceramic spheres or hollow steel spheres.

The spacers may be manufactured from different materials. More particularly, it is highly advantageous for the present process when the spacers are stable to pressure and have maximum hardness. The spacer thus advantageously has a hardness according to the Mohs hardness scale of greater than 5, preferably greater than 6, especially greater than 7. This is because it is advantageous when the spacer withstands the pressure in the course of pressing. The spacer is therefore especially made of glass, ceramic, metal, metal alloy, aluminum oxide, silicon dioxide, zirconium oxide, nitride, especially boron nitride, or carbide, especially silicon carbide. Metals are considered to be especially ferrous metals, non-ferrous metals or white metals.

The spacers advantageously possess a very narrow size distribution, especially a monomodal size distribution, which means that all spacers have about the same size.

The spacer is most preferably made of glass, steel or ceramic.

The proportion of the spacer is preferably selected such that the proportion by volume of the spacer is not more than 10% by volume, especially between 0.1 and 4% by volume, preferably between 0.5 and 3% by volume.

The spacers advantageously have a particle size of less than 1 mm.

The spacers can be introduced into the adhesive in the course of production thereof, or they can be mixed into the adhesive, blown into the adhesive, or scattered into or onto the adhesive during or immediately after the application of the adhesive in step a). Any such spacers present are considered in this document as a constituent of the adhesive.

The adhesive has a high viscosity, which means that it has a viscosity of more than 900 Pas, especially more than 1000 Pas, at 25° C. The viscosity at 25° C. preferably has a value between 1000 Pas and 4000 Pas. The viscosity at 25° C. most preferably has a value between 1000 Pas and 3000 Pas, especially between 1100 and 2800 Pas. The viscosity is measured here by oscillographic methods by means of a rheometer with a heatable plate (CVO 120 HR, from Bohlin) (gap 1000 µm, measurement plate diameter: 25 mm (plate/plate), deformation 0.01 at 5 Hz, temperature: 25° C.). At 60° C., the adhesive advantageously has a viscosity (measured correspondingly at 60° C.) between 600 and 50 Pas. At 50° C., the adhesive advantageously has a viscosity (measured correspondingly at 50° C.) between 800 and 150 Pas.

In a first step, (a), of the process according to the invention, the adhesive is applied to an inner panel or an outer panel. This is advantageously done at an application temperature of the adhesive of 23° C. to 80° C., especially of 23° C. to 60° C., preferably of 50 to 60° C.

The adhesive is typically applied in the edge region of the outer panel. The amount and exact position of application of the adhesive is such that, after the pressing described below, the hem flange is very substantially filled with adhesive. The application is preferably automatic and preferably in the form of an adhesive bead.

In a second step, (b), of the process according to the invention, the adhesive is then contacted with the inner panel or the outer panel. Inner panel and outer panel are thus now in contact with the adhesive.

It will be appreciated that it is also possible that a plurality of inner panels which are adhesive bonded to one another with repetition of steps (a) and (b) can also be used for the production of a hem flange.

In a third step, (c), of the process according to the invention, the outer panel is flanged around the inner panel, such that adhesive is present in the inner space of the hem thus formed.

In a fourth step, (d), of the process according to the invention, the hem flange is now pressed. The hem flange is preferably pressed to an adhesive layer thickness ($d_x$) which corresponds to the thickness ($d_y$) of any spacer present.

The thickness of the spacer, also referred to as "$d_y$" in this document is considered to be the thickness of the spacer at right angles to the outer panel surface. More precisely in geometric terms, the thickness of the spacer is defined as the spatial extent of the spacer in the direction parallel to the normal vector of the tangential face of the inner panel surface at the point closest to the spacer.

The pressing reduces the adhesive layer thickness, which is also referred to in this document as "$d_x$", and in such a way that it corresponds to the thickness of the spacer. In this context, the expression "corresponds" should not be interpreted as "absolutely identical". It also includes small deviations from this value, which are typically not more than 20%. This is because, in the case of absolute identity, no adhesive bonding agent, i.e. reactive adhesive constituents, would be present between the spacer and inner panel or outer panel. Although this is possible in principle, it is advantageous when a thin layer of adhesive bonding agent is present between spacer and inner panel and/or outer panel. On the other hand, in the case of very hard spacers, these can under some circumstances be partly impressed into the panel. This is acceptable provided that it does not lead to any troublesome impressions on the outer panel.

The thickness of the spacer is especially influenced in particular by the thickness of the hem flange to be achieved and hence especially by the thickness of the outer panel, also referred to in this document as "$d_z$". The ratio of the thickness ($d_y$) of the spacer to the thickness ($d_z$) of the outer panel preferably has a value of 0.05-0.80. In the case of a typical thickness of an outer panel for a hem flange adhesive bond of 0.5 to 1.5 mm, spacers of thickness of especially 0.08 to 0.4 mm are therefore used. Preference is given to spacers of thickness 0.1 to 0.2 mm and outer panels of thickness 0.5 to 1.2 mm. The thickness of the inner panels is preferably selected within a similar thickness range to the outer panel.

Suitable inner panels and outer panels are in principle all the panels known to those skilled in the art. These are especially those panel materials which are already used for hem flange adhesive bonding in the construction of modes of transport or in the manufacture of white goods.

Preferred panels are made of steel, especially electrolytically galvanized, hot-dip galvanized, oiled steel, bonazinc-coated steel, and subsequently phosphated steel, and aluminum, especially in the variants which typically occur in automaking.

The flanging and pressing are effected with tools known to those skilled in the art.

After the pressing, when the pressure is released, there is a certain rebound, which leads to the effect that the volume of the hem flange bordered by the inner sheet and outer sheet enlarges. In the process according to the invention, owing to the adhesive used, this enlargement in volume is substantially compensated by the high-viscosity adhesive, and significantly fewer air bubbles or channels (also known as meanders) occur.

In a further step, (e), of the process according to the invention, thermal energy is introduced into the adhesive. The supply of thermal energy brings about the crosslinking of the adhesive in heat-curing adhesives or accelerates the crosslinking of the adhesive, such that a sufficiently high strength of the hem flange adhesive bond is achieved as rapidly as possible.

Step (e) is therefore preferably followed by step (f) of crosslinking the adhesive.

In a particularly preferred embodiment, the step of pressing (d) or the step of introducing thermal energy (e) is followed by a step (g) of sealing the hem flange seam by means of a sealant. The sealant firstly has the function of giving the hem flange seam a visually clean appearance, since it is in many cases visible, and secondly of compensating for the adhesive pulled back into the hem by the rebound of the hem flange after the pressure release, and of sealing of the seam. It is preferred that substantially no air bubbles are present in the hem flange and the intermediate space between outer panel and inner panel is very substantially filled with adhesive and/or sealant.

The sealants used for the hem flange seam sealing are sealants which are already known. In one embodiment, the sealant can be precured or cured by UV light. In a further embodiment, the sealant is likewise crosslinked or accelerated by means of the supply of thermal energy. Step (g) is thus advantageously followed by a further step, (h), of supplying thermal energy to the sealant (10).

Suitable sealants are one-component sealants which are heat- or UV-curing, or room temperature curing or precuring, two-component epoxy resin or polyurethane or (meth)acrylate sealants, or vulcanizable rubber sealants. It is important that these sealants efficiently fulfill their sealant function and are advantageously elastic.

It is highly advantageous when both adhesive and sealant are very substantially resistant to washout, since the hem flange adhesive bonds produced in this way typically go into a cathodic electrocoating bath, which should as far as possible not soil them.

Especially preferably, the adhesive used for hem flange adhesive bonding can also be used as a sealant. This has the great advantage that only one adhesive and sealant is used for adhesive bonding and sealing of the hem flange, which in turn brings logistical and application advantages.

It has been found to be particularly preferred when the sealant is crosslinked together with the adhesive by thermal energy.

In certain cases, it may be advantageous first to at least precrosslink the adhesive before the application of the sealant by means of the introduction of thermal energy, and then to completely cure it together with the sealant.

When thermal energy has to be supplied only once in the process described, i.e. when the adhesive and the sealant are crosslinked simultaneously, this is particularly advantageous, since one step can be dispensed with.

The thermal energy is introduced into the adhesive especially by means of infrared radiation or induction heating.

It is advantageous when the introduction of thermal energy heats the adhesive to a temperature of 100-220° C., preferably 120-200° C.

The final crosslinking can also be effected in the cathodic electrocoating oven.

A further aspect of the invention relates to a hem flange adhesive bond which is produced by the process described above.

The invention further relates to the use of the process described above for producing hem flange adhesive bonds in the manufacture of modes of transport, especially of automobiles, buses, trucks, rail vehicles, ships or aircraft, or white goods, especially washing machine, tumble dryers or dishwashers.

A further aspect of the invention relates to a hem flange adhesive bonded assembly which a flanged outer panel, an inner panel and a crosslinked adhesive, as described above, which is arranged between the unbent inner flank of the outer panel and the inner panel. In a preferred embodiment, the adhesive comprises spacers of spacer thickness ($d_y$) which are incorporated between the unbent inner flank of the outer panel and the inner panel. The edge of the inner panel in the hem flange here is preferably completely surrounded by adhesive. In a particularly preferred embodiment, the hem flange seam formed by the edge of the outer panel and the inner panel is sealed by means of a sealant.

Finally, in a further aspect of the invention, an article which comprises a hem flange adhesive bond as described is claimed.

Such articles or hem flange adhesive bonded assemblies are especially modes or transport, especially an automobile, bus, truck, rail vehicle, a ship or an aircraft, or a white good, especially a washing machine, tumble dryer or dishwasher.

BRIEF DESCRIPTION OF THE DRAWINGS

Selected working examples of the invention are explained in detail hereinafter with reference to the drawings. Identical elements in the different figures are provided with the same reference numerals. The direction of forces or movements is indicated with arrows.

The figures show:

FIGS. 1*a* to 1*d* show schematic diagrams of different intermediate stages in the process for producing a hem flange adhesive bond.

In a first step, a), of this process, the adhesive 4, which has a viscosity at 25° C. of >900 Pas, especially >1000 Pas, is applied to the edge region of an outer panel 2. FIG. 1*a* shows the intermediate stage of a preferred embodiment with spacers 5 after this first step. In this diagram, the adhesive 4 is applied in the form of a round bead in the region of the edge region of the outer panel 2, where the contact with the inner panel is to be. In this diagram, the outer panel 2 already has a shaping of the edge region. Such a shaping may already exist before the application of the adhesive or be effected in the course of the flanging. The spacers 5 in this diagram are spheres.

In a second step, b), of this process, the adhesive 4 is contacted with the inner panel 3. FIG. 1*b* shows a schematic of this process. In this diagram, the inner panel 3 is moved from the top toward the outer panel 2 covered with adhesive 4, and contact is established between inner panel 3 and adhesive 4 with gentle pressure.

In a third step, c), of this process, the outer panel 2 is flanged around the inner panel 3, such that adhesive 4 is present in the inner space 11 of the hem flange 1. In a fourth step, d), the hem flange 1 is pressed. In the embodiment shown here, the hem flange is pressed to an adhesive layer thickness $d_x$ which corresponds to the thickness $d_y$ of the spacer 5. FIG. 1*c* shows the intermediate stage after these two process steps. The edge 7 of the inner panel 3 is completely surrounded by the adhesive 4, while the edge 8 of the outer panel 2, which forms the hem flange seam 9 together with the inner panel 3, is exposed, not completely surrounded by the adhesive. The adhesive 4 and the spacers 5 present therein are not only present in the bent part of the hem flange but also in the region between inner panel 3 and the unbent outer panel 2. Spacers 5 are thus present between the inner panel 3 and the unbent inner flank 6 of the outer panel 2.

FIG. 1*d* shows the further step, e), of introducing thermal energy (A) into the adhesive 4. This crosslinks the adhesive in step f). In this diagram, the thermal energy is by thermal radiation, which acts on the hem flange 1 in the region of the flanging. This can be introduced, for example, by means of an IR radiator or hot air gun. The heated outer panel 2 transfers the heat to the adhesive 4, which then crosslinks under the action of heat. All-round heating around the hem flange would be optimal in order to ensure rapid homogeneous through-curing of the adhesive 4. Another alternative to this would be heating by induction. The adhesive 4 completely fills the inner space 11 of the hem flange 1 without formation of air bubbles. The hem flange adhesive bonded assembly 1' thus produced can be used, for example, as a door or to produce a door.

FIG. 2*a* shows a schematic of this situation after the application of the adhesive.

In the second step, b), of this process, the adhesive 4 is contacted here with the outer panel 2. FIG. 2*b* shows this process schematically. In this diagram, the inner panel 3 is turned round after the application of the adhesive 4, and the adhesive 4 is thus moved toward the outer panel 2, and contact is established between outer panel 2 and adhesive 4 with gentle pressure.

Figure 1A:
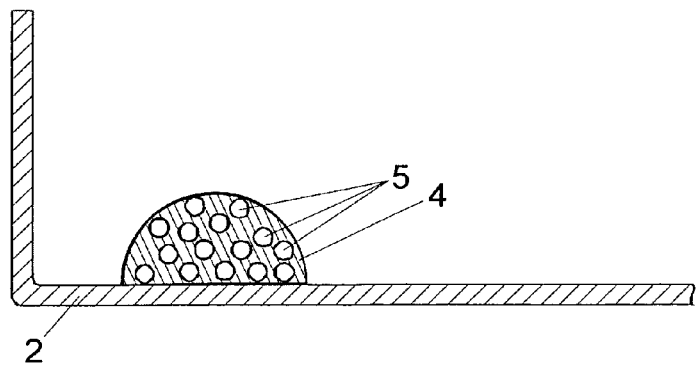
FIG. 1*a-d* a schematic cross-sectional diagram of the production of a preferred hem flange adhesive bond comprising different stages FIG. 1*a* application of an adhesive to the outer panel FIG. 1*b* contacting of the adhesive with the inner panel FIG. 1*c* flanging the outer panel and pressing the hem flange FIG. 1*d* introducing thermal energy and crosslinking the adhesive FIGS. 2*a*, 2*b* a schematic cross-sectional diagram of alternative process steps to FIG. 1*a* and FIG. 1*b* in the production of a hem flange adhesive bond FIG. 2*a* application of an adhesive to the inner panel FIG. 2*b* contacting of the adhesive with the outer panel FIG. 3 a schematic cross-sectional diagram of a hem flange adhesive bonded assembly with sealant applied on the hem flange seam FIG. 4 a schematic cross-sectional diagram of a hem flange adhesive bonded assembly without spacers 5 without (FIG. 4*a*) and with (FIG. 4*b*) sealant applied to the hem flange seam FIG. 5 a schematic cross-sectional diagram of different spacer geometries
Figure 1B:
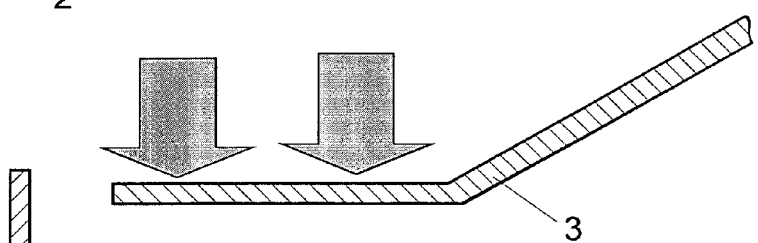
Figure 1C:
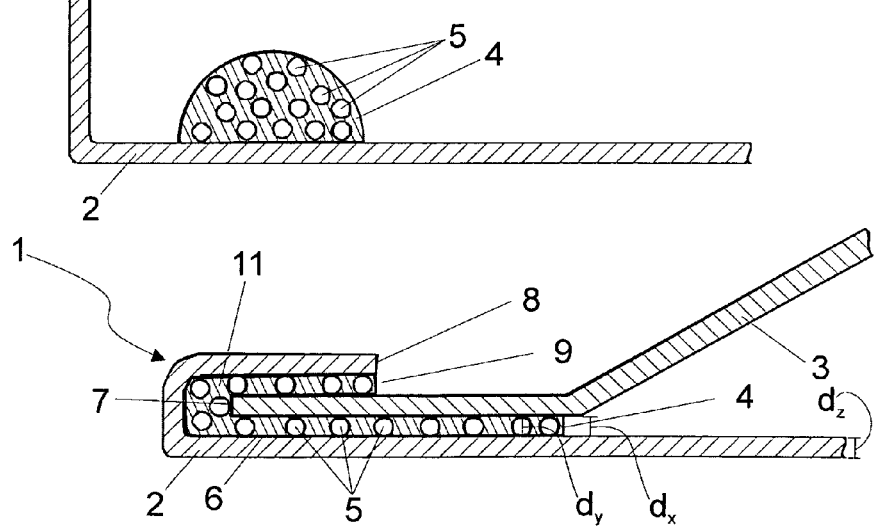
Figure 1D:
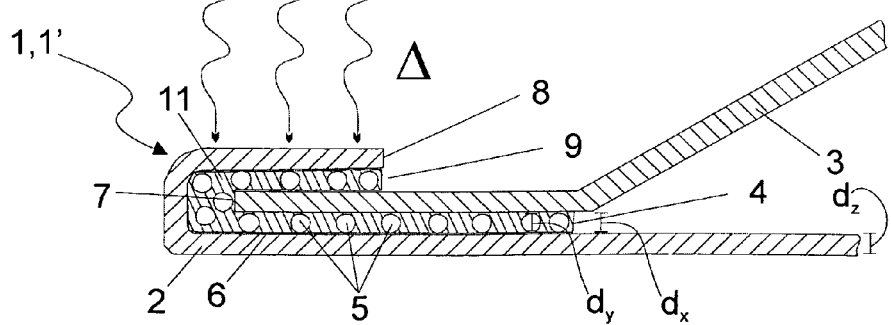
Figure 2A:
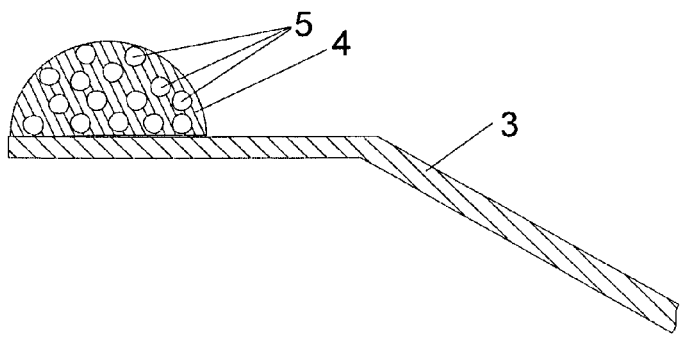
FIG. 2*a* and FIG. 2*b* show an alternative to the steps shown in FIGS. 1*a* and 1*b*. In the first step, a), of this process, the adhesive 4, which has a viscosity at 25° C. of >900 Pas, is applied here to the inner panel 3. In this diagram, the adhesive 4 is applied in the form of a round bead to the edge region of the inner panel 3 around which the outer panel is to be flanged.
Figure 2B:
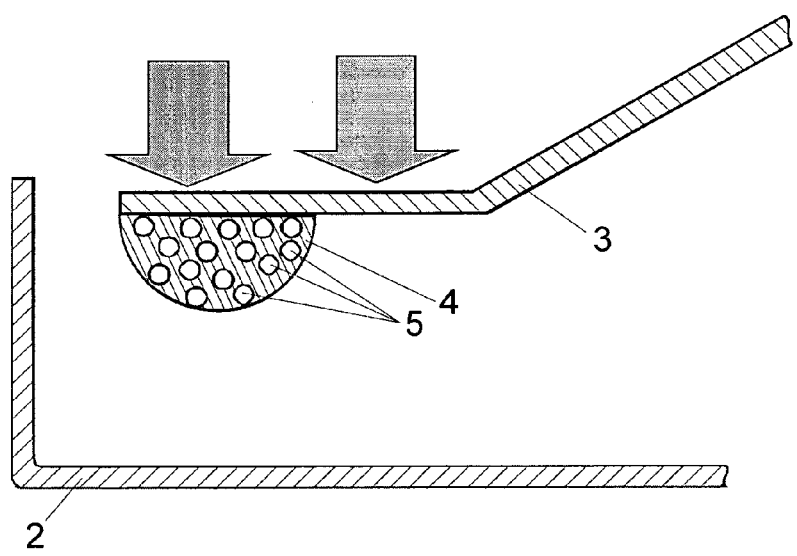

In the form shown here, the sealant 10 overlaps the outside of the outer panel 2 and the outside of the inner panel 3, such that all of the edge 8 of the outer panel 2 is surrounded by sealant 10 or adhesive 4, in order to very optimally ensure complete sealing. However, it may also be the case that the sealant seals only the hem flange seam 9. This may be advantageous from a visual standpoint, but is less advantageous from a corrosion standpoint, since the outer panel 2 at risk of corrosion can exist at the edge 8 of the outer panel. The adhesive 4 completely fills the inner space 11 of the hem flange 1 without formation of air bubbles, while the sealant 10 completely seals the hem flange seam 9 without formation of air bubbles or channels. After the curing of the adhesive 10, the hem flange adhesive bonded assembly 1' thus produced can be used, for example, as a door or for producing a door.

Figure 3:
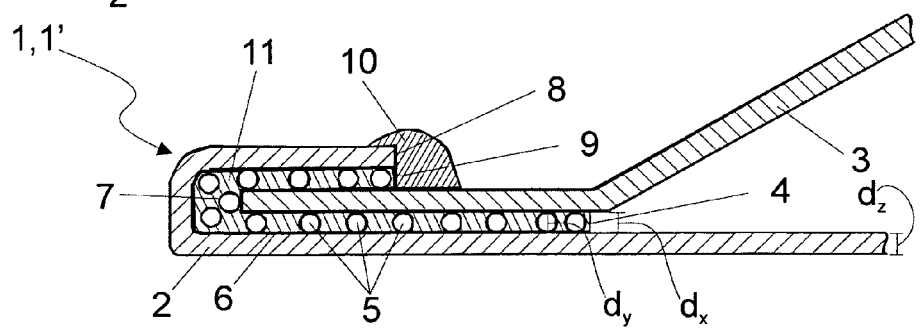
FIG. 3 shows a schematic of a preferred embodiment in which a sealant 10 seals the hem flange seam 9 of the hem flange 1. As already described in FIGS. 1*a* to 1*d*, a hem flange seam 9 forms when a hem flange 1 is produced from the edge 7 of the outer panel 2 and the inner panel 3. This hem flange seam 9 is sealed by a sealant 10. The sealant can be applied manually or automatically. It is preferably applied automatically. The sealant can be effected after step d) of pressing or after step e) of introducing introducing thermal energy into the adhesive. Particular preference is given to curing adhesive 4 and sealant 10 simultaneously with supply of thermal energy.
Figure 4A:
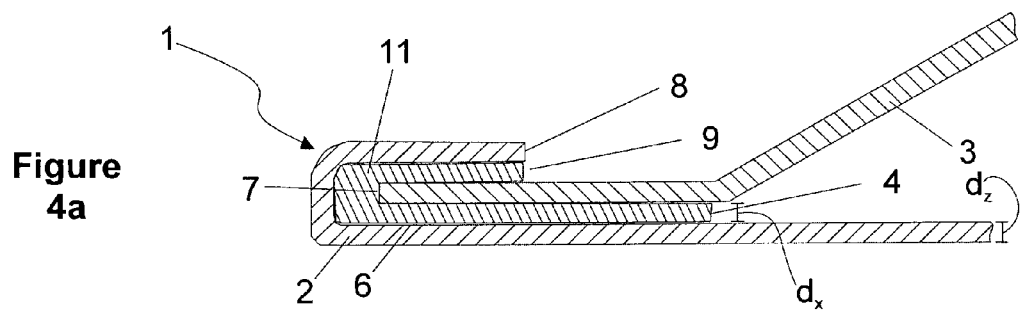
Figure 4B:
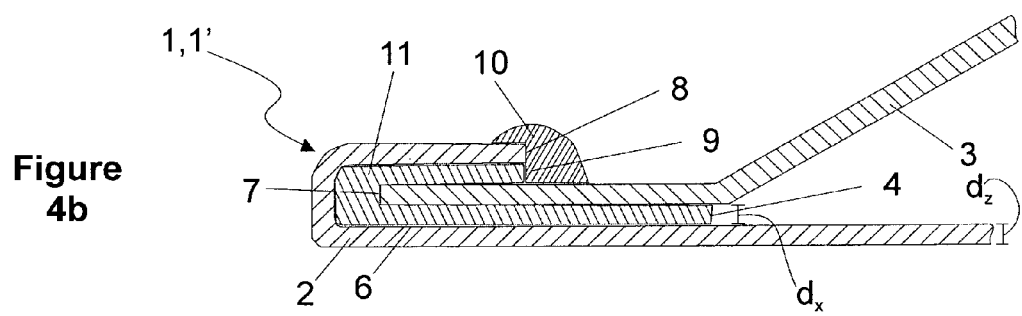

FIG. 4, i.e. FIG. 4a and FIG. 4b, shows a schematic of an embodiment of a hem flange adhesive bonded assembly 1' without spacers 5. The hem flange adhesive bonded assembly according to FIG. 4a has no sealant 10, whereas that of FIG. 4b has a sealant 10 and corresponds to that of FIG. 3, except that the adhesive here does not contain any spacers 5. The production of this hem flange adhesive bonded assembly 1' corresponds to that as already described in FIGS. 1a-1d, 2a, 2b and 3 for the hem flange adhesive bonded assembly 1' containing the corresponding spacers 5.

Figures 5A, 5B, 5C, 5D:
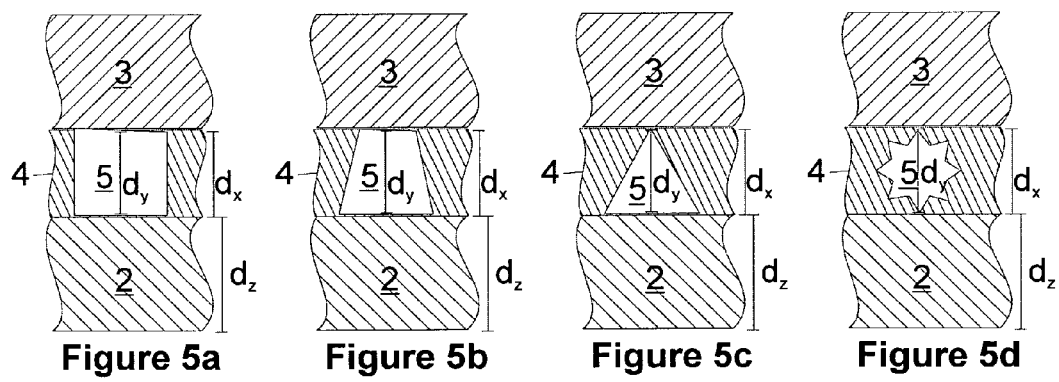

FIGS. 5a to 5b show further examples of different spacer geometries in a cross section through a hem flange adhesive bonded assembly 1'. For the sake of simplicity, only outer panel 2, inner panel 3, adhesive 4 and spacers 5 were shown. The adhesive 4 has been pressed to an adhesive thickness $d_x$.

The spacer 5 has a thickness $d_y$ of the spacer. The outer panel has the thickness $d_z$. The $d_y/d_z$ ratio of the thicknesses of the spacer 5 to thicknesses of the outer panel 2 in FIGS. 4a to 4d is less than 0.80.

In FIG. 5a, the spacer has a square cross-sectional area. This can be achieved, for example, in spacers 5 in the form of a cube or cylinder. In a less preferred variant thereof, the cross-sectional area of the spacer 5 is a rectangle, which can be achieved by a spacer form of a cuboid or cylinder. In FIG. 5b, the spacer has a trapezoidal cross-sectional area. This can be achieved, for example, in spacers 5 in the form of a frustopyramid or frustocone. In FIG. 5c, the spacer has a triangular cross-sectional area. This can be achieved, for example, in spacers 5 in the form of a pyramid or a cone. In FIG. 5d, the spacer has a cross-sectional area of a star as an example of a polyhedral cross-sectional area. This can be achieved, for example, in spacers 5 in spheres provided with points. The embodiments of FIGS. 5c and 5d have points which are at right angles to the inner panel 3. These points generate high forces on the inner panel in the course of pressing, such that there is the risk here that it can deform at this point. Such a deformation is in many cases visible from outside. Since such a deformation or impression usually cannot be accepted, the embodiments of FIGS. 5c and 5d are less preferred.

| List of Reference Numerals | |
|---|---|
| 1 | Hem flange |
| 1' | Hem flange adhesive bonded assembly |
| 2 | Outer panel |
| 3 | Inner panel |
| 4 | Adhesive |
| 5 | Spacer |
| 6 | Unbent inner flank of the outer panel 2 |
| 7 | Edge of the inner panel 6 |
| 8 | Edge of the outer panel 2 |
| 9 | Hem flange seam |
| 10 | Sealant |
| 11 | Inner space of the hem flange 1 |
| $d_x$ | Adhesive layer thickness |
| $d_y$ | Thickness of the spacer 5 |
| $d_z$ | Thickness of the outer panel 2 |
| $\Delta$ | Thermal energy |

EXAMPLES

SikaPower®-496/3 is a heat-curing one-component epoxy resin adhesive commercially available from Sika Automotive GmbH. This adhesive designated K1 has a viscosity of approx. 2700 Pas at 25° C. and of approx. 100 Pas at 60° C.

The viscosity was measured by oscillographic methods by means of a rheometer with a heatable plate (CVO 120 HR, from Bohlin) (gap 1000 μm, cone-plate diameter: 25 mm (plate/plate), deformation 0.01 at 5 Hz, temperature: 20° C.-70° C., heating rate 10° C./min).

A further heat-curing one-component epoxy resin adhesive was produced by adding to SikaPower®-496/3 2% by volume of glass spheres of diameter 0.25 mm with stirring and subsequent evacuation. This adhesive designated K2 has a viscosity of approx. 2800 Pas at 25° C. and of approx. 104 Pas at 60° C.

SikaPower®-490B3 designated R1 constitutes a comparative adhesive which is commercially available from Sika Automotive GmbH and is likewise a heat-curing one-component epoxy resin adhesive. It has a viscosity of approx. 350 Pas at 25° C. and of 30 Pas at 60° C.

The substrate used was in each case electrolytically galvanized steel panel (DC-04+ZE75-75AO) (thickness 0.8 mm) ("panel"), which had previously been cleaned by means of acetone and oiled with 3 g/m$^2$ of standard oil (3802-39S (from Fuchs)).

The adhesives were applied as a round bead to an electrolytically galvanized steel panel (DC-04+ZE75-75AO) (thickness 0.8 mm) at 50-60° C., and a further panel (thickness 0.8 mm) was laid on and flanged. The same adhesive in each case was applied as a sealant to the hem flange and cured at 175° C. over 25 min.

The hem flange thus formed was cut in the middle by means of metal shears and the cut surface was assessed. Bubble formation in the hem flange and sealant were assessed qualitatively and reported in Table 1.

In a second test series, 0.3 g of the particular adhesive in each case was applied at 50-60° C. to such an electrolytically galvanized steel panel (50 mm×50 mm×0.8 mm). A piece of rubber of thickness 0.2 mm was placed in each corner to simulate rebound. Then an identical panel (50 mm×50 mm×0.8 mm) was applied to the adhesive and pressed with a pressure of 8 t/25 cm$^2$ by means of a press. Subsequently, this assembly was cured in a forced-air oven at 175° C. over 25 min. Subsequently, the sandwich adhesive bond was broken by means of a wedge and the fracture was assessed qualitatively, which is reported in Table 1.

TABLE 1

| | Visual assessment | |
|---|---|---|
| Air bubble formation in the hem flange | Air bubble formation in the sealant | Meander formation in the sandwich assembly |
| K1 Small bubbles | Small bubbles | Some small meanders in the edge region |
| K2 No bubbles | No bubbles | Very small meanders in the edge region |
| R1 Some bubbles | Some bubbles | Large meanders over the whole area |

The invention claimed is:

1. A process for producing a hem flange adhesive bond, comprising at least the steps of:
a) applying an adhesive which has a viscosity at 25° C. of >900 Pa·s to an inner panel or to an outer panel, wherein the adhesive contains a spacer, wherein the adhesive is a heat-curing one-component epoxy resin adhesive comprising:
at least one epoxy resin A with an average of more than one epoxy group per molecule,
at least one hardener B for epoxy resins which is activated by elevated temperature,
at least one terminally capped polyurethane prepolymer of formula (I):

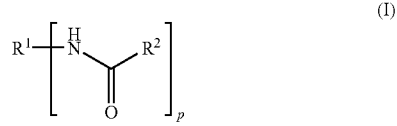

(I)

where $R^1$ is a p-valent radical of an isocyanate-terminated linear or branched polyurethane prepolymer PU1 after removal of the terminal isocyanate groups,
p is from 2 to 8, and
$R^2$ is independently a substituent selected from the group consisting of

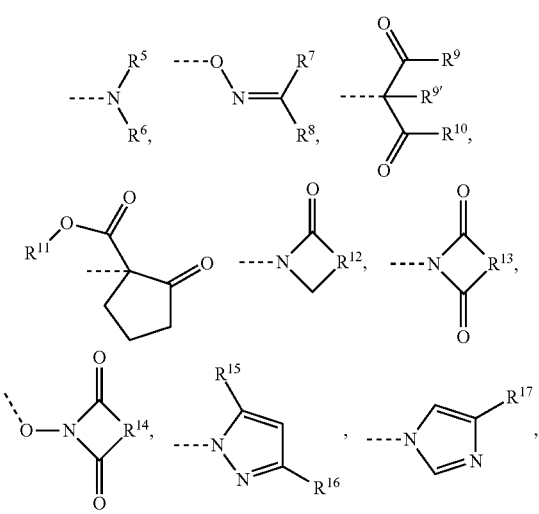

-continued

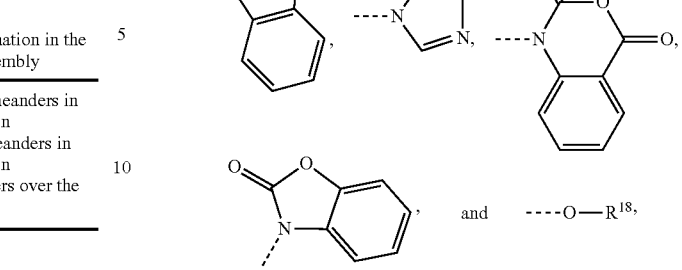

where
$R^5$, $R^6$, $R^7$ and $R^8$ are each independently an alkyl or cycloalkyl or aralkyl or arylalkyl group, or $R^3$ together with $R^6$, or $R^7$ together with $R^8$, form part of a 4- to 7-membered ring which is at most substituted,
$R^9$, $R^{9'}$ and $R^{10}$ are each independently an alkyl or aralkyl or arylalkyl group, or an alkyloxy or aryloxy or aralkyloxy group,
$R^{11}$ is an alkyl group,
$R^{12}$, $R^{13}$ and $R^{14}$ are each independently an alkylene group which has 2 to 5 carbon atoms and optionally has double bonds or is substituted, or a phenylene group or a hydrogenated phenylene group,
$R^{15}$, $R^{16}$ and $R^{17}$ are each independently H or an alkyl group or an aryl group or aralkyl group,
$R^{18}$ is an aralkyl group or a mono- or polycyclic, substituted or unsubstituted aromatic group which optionally has aromatic hydroxyl groups, and
m is 1, 2 or 3;
b) contacting the adhesive with the inner panel or the outer panel;
c) flanging the outer panel around the inner panel such that the adhesive is present in the interior of the hem flange;
d) pressing the hem flange; and
e) introducing thermal energy into the adhesive; wherein step d) or step e) is followed by a step g) of sealing the hem flange with a sealant.

2. The process as claimed in claim 1, wherein step e) is followed by a step f) of crosslinking the adhesive.

3. The process as claimed in claim 1, wherein step g) is followed by a further step (h) of introducing thermal energy into the sealant.

4. The process as claimed in claim 1, wherein the sealant is precured or hardened with UV radiation.

5. The process as claimed in claim 1, wherein the sealant is a room temperature curing or precuring two-component epoxy resin sealant or polyurethane sealant or (meth)acrylate sealant or vulcanizable rubber sealant.

6. The process as claimed in claim 1, wherein the thermal energy is introduced into the adhesive by infrared radiation or induction heating.

7. The process as claimed in claim 1, wherein the hem flange is pressed in step d) to an adhesive layer thickness which corresponds to a thickness of the spacer.

8. The process as claimed in claim 1, wherein a ratio of a thickness of the spacer to the thickness of the outer panel is 0.05-0.80.

9. The process as claimed in claim 1, wherein the spacer has a spheroidal shape.

10. The process as claimed in claim 1, wherein the spacer is manufactured from a material which has a hardness by the Mohs hardness scale of greater than 5.

11. The process as claimed in claim 1, wherein the spacer is composed of glass, ceramic, metal, metal alloy, aluminum oxide, silicon dioxide, zirconium oxide, nitride, or carbide.

12. The process for producing hem flange adhesive bonds as claimed in claim 1, further comprising the step of using the hem flange in the manufacture of a mode of transport or a white good.

13. The process as claimed in claim 1, wherein $R^2$ is independently a substituent selected from the group consisting of

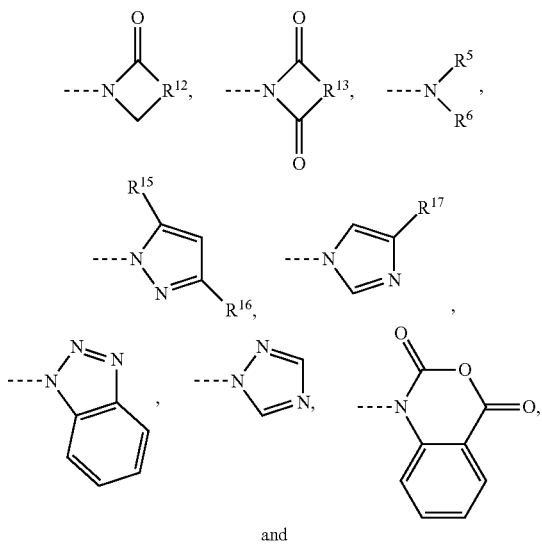

and

14. The process as claimed in claim 1, wherein $R^2$ is independently a substituent selected from the group consisting of

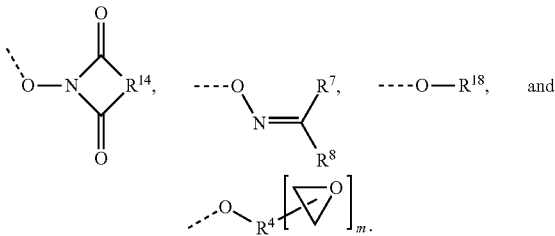

15. The process as claimed in claim 1, wherein $R^2$ is independently a substituent selected from the group consisting of

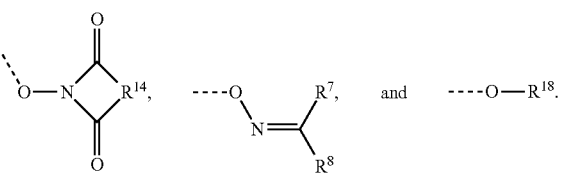

16. The process as claimed in claim 1, wherein $R^2$ is

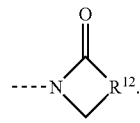

17. The process as claimed in claim 1, wherein $R^2$ is

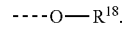

* * * * *